No. 802,051. PATENTED OCT. 17, 1905.
C. LUYERS.
COMPRESSED AIR BRAKE FOR RAILWAY WAGONS AND THE LIKE.
APPLICATION FILED SEPT. 28, 1903.
2 SHEETS—SHEET 1.
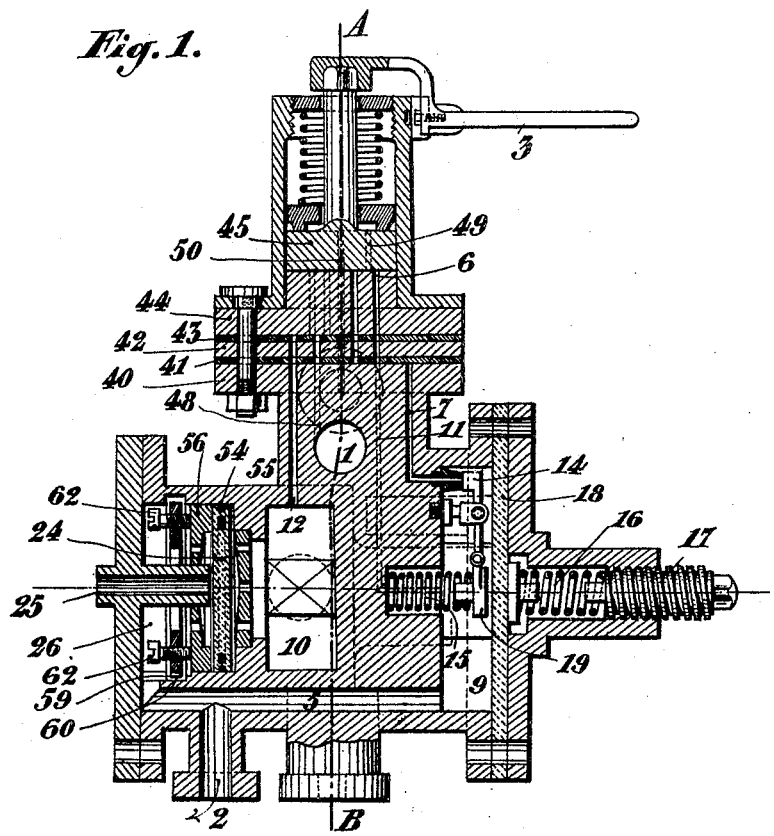
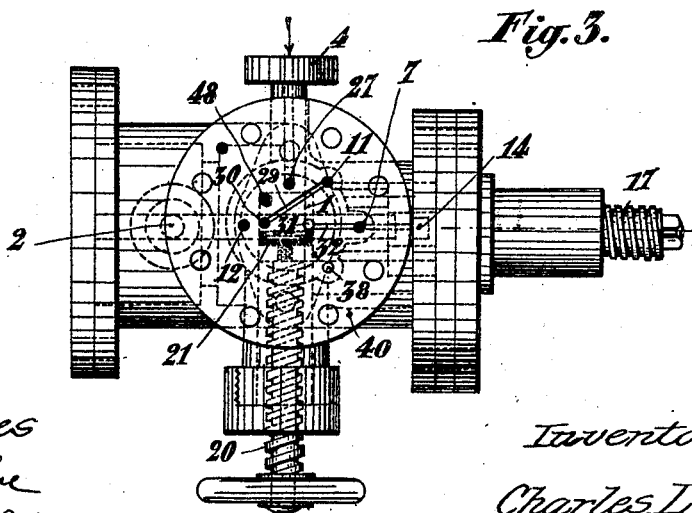
Witnesses
WM. Kuehne
JP. Numan
Inventor
Charles Luyers
by Richards
Attorneys No. 802,051. PATENTED OCT. 17, 1905.
C. LUYERS.
COMPRESSED AIR BRAKE FOR RAILWAY WAGONS AND THE LIKE.
APPLICATION FILED SEPT. 28, 1903.
2 SHEETS—SHEET 2.
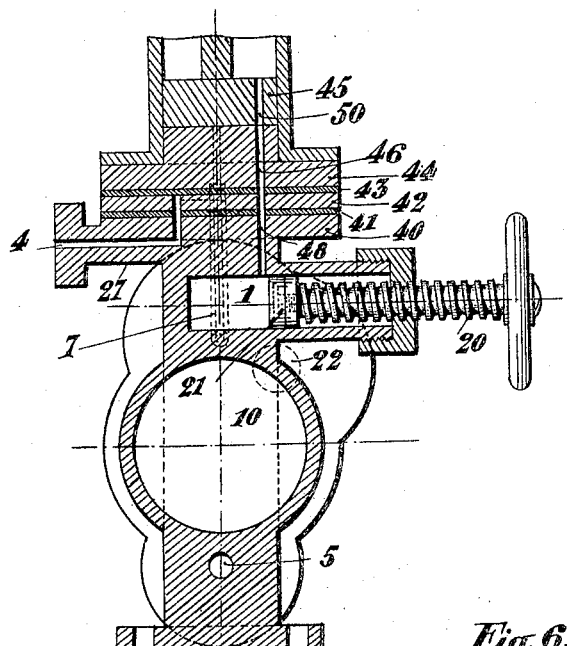
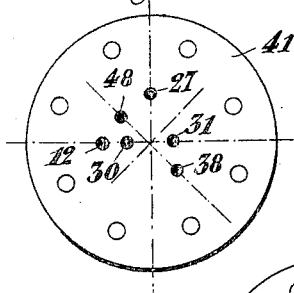
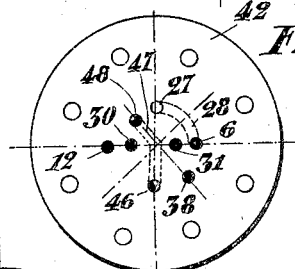
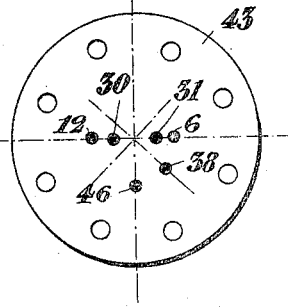
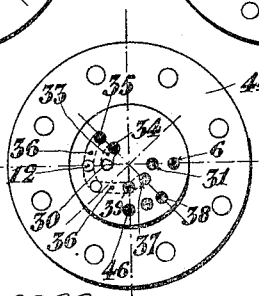
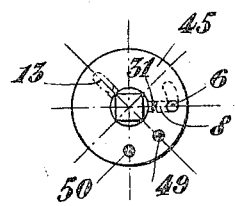
Witnesses
H. M. Kuehne
J. P. Newman
Inventor
Charles Luyers
ATTORNEYS

UNITED STATES PATENT OFFICE.

CHARLES LUYERS, OF BRUSSELS, BELGIUM.

COMPRESSED-AIR BRAKE FOR RAILWAY-WAGONS AND THE LIKE.

No. 802,051.   Specification of Letters Patent.   Patented Oct. 17, 1905.

Application filed September 28, 1903. Serial No. 174,931.

*To all whom it may concern:*

Be it known that I, CHARLES LUYERS, a subject of the King of the Belgians, and a resident of Brussels, Belgium, have invented certain new and useful Improvements in Compressed-Air Brakes for Railway-Wagons and the Like, of which the following is a specification.

This invention has reference to a cock for operating continuous brakes worked by compressed air for the purpose of producing either a moderate fall in pressure in the train-pipe with the object of effecting a partial braking on inclines and on curves or a great fall in pressure which shall vary according to the general condition of the atmosphere for the purpose of effecting a complete braking or stoppage as rapidly as possible, while avoiding the locking or skidding of the wheels.

Other operating-cocks have already been proposed for the purpose of effecting the above-described object; but the present construction is distinguished by the possession of the following characteristic features.

(*a*) The cock is adjusted beforehand according to the condition of the atmosphere, with the result that when stoppage by braking is necessary the driver can produce the exact braking effect desired by simply operating the cock-lever to its full extent—that is to say, he has not to trouble about observing the graduations of a scale in order to stop the movement of the cock-lever in front of one or the other of those graduations according as he thinks that the fall in pressure in the train-pipe should be greater or less in order to produce the most effective braking action in view of the condition of the atmosphere. This is an impracticable operation in case of sudden emergency.

(*b*) The partial or maximum fall in pressure, which is produced in the train-pipe by operating of the cock, is always determined exactly beforehand and can never be either a little too great or a little too small.

In order to obtain these results, instead of the cock placing the train-pipe in direct communication with the atmosphere in order to produce a fall in pressure in said pipe the operation of the cock has the result of effecting communication between one or more expansion-chambers and a central chamber containing air of the same pressure as that in the train-pipe and separated from the duct, which connects the train-pipe to the atmosphere by a diaphragm so arranged as to close the said duct when the air-pressure is the same in the central chamber and in the train-pipe, while it opens said duct as soon as this equilibrium is destroyed and keeps it open so long as the air-pressure in the train-pipe remains greater than in the said chamber. A partial fall in pressure is effected by causing the central chamber to communicate with one of these expansion-chambers of constant capacity, with the result that a partial and constant expansion of the air in the central chamber, and consequently an equal expansion or fall of pressure in the train-pipe, occurs. The maximum fall of pressure is produced by establishing communication between the central chamber both with the aforesaid expansion-chamber as well as with a second expansion-chamber, whose capacity may be adjusted beforehand in accordance with the atmospheric conditions. The expansion of the air in the central chamber, and consequently the fall in pressure produced in the train-pipe, will vary in proportion as the capacity of the said second expansion-chamber is greater or less.

In the accompanying drawings, Figure 1 is a vertical section of an operating-cock according to this invention. Fig. 2 is a vertical section thereof through A B, Fig. 1, taken from the left side of Fig. 1. Fig. 3 is a plan view thereof, the upper removable parts of the cock having been removed. Figs. 5 and 7 are plans of the metallic fixed disks of the cock pierced with holes which correspond with the various air-ducts and which are provided with slots or grooves that form permanent connections between the said ducts. Figs. 4 and 6 are similar views of the perforated india-rubber disks inserted between the metallic disks, and Fig. 8 is a plan of the movable part of the cock in which are formed slots or grooves which serve to establish temporary communications between the ducts.

Disks 41, 42, 43, 44, and 45 (shown separately in Figs. 4 to 8) are secured upon the circular piece 40, Fig. 3, in the order shown in Figs. 1 and 2. In the position shown in Figs. 1, 2, and 3 the cock is connected on one hand by the duct to the train-pipe and on the other hand by the duct 4 to the compressed-air reservoir. From the duct 4 this air passes by duct 27 through disk 41, a connecting-groove 28 of disk 42, and a duct 6 through disks 43 and 44 to groove 8 of movable disk 45, which connects said duct 6 with duct 31, through which the air passes into groove 32 of circular piece 40, Fig. 3, and from thence through duct 7, Fig. 1, into a chamber 9, Fig. 1, whence it passes by the duct into the train-pipe 2 and by the duct 11, the groove 29, Fig. 3, the duct 30, the groove 33 of disk 44, the duct 34, the groove 13 of movable disk 45, the duct 35, the groove 36 of disk 44, and the duct 12 into the central chamber 10. As soon as the desired pressure has been obtained in the train-pipe 2 and the central chamber 10 a plug 14 is pushed by a spring 15 against the orifice of the duct 7, so as to cut off communication with the compressed-air reservoir. This plug 14 is carried by one arm of a rocking lever mounted in the chamber 9, the other arm of which is situated between the spring 15 and one face of a disk or diaphragm of flexible material 18, which closes air-tight the chamber 9 and against the other face of which there presses a spring 16, whose tension is regulated, by means of a screw 17, in such a manner that until the air in the chamber 9 has reached the desired pressure this spring 16 will press the disk 18 against the arm 19 of the lever and will keep the plug 14 away from the orifice of the duct 7, and thus allow the air to enter the chamber 9; but as soon as the desired pressure in the chamber 9 is reached this pressure pushes back the disk 18, compressing the spring 16, and allows the spring 15 to expand and to press the plug 14 against the orifice of the duct 7. If by reason of leakage a fall in pressure should be produced accidentally in the train-pipe, and consequently in the chamber 9, the plug 14 will be immediately moved away from the orifice of the duct 7, which will remain open until the desired pressure has been reëstablished.

The duct that connects the chamber 9 to the train-pipe 2 is extended into a chamber 26, separated from the chamber 10 by a partition or diaphragm 24, of caoutchouc or suitable flexible material, which is maintained in position by the edges of a perforated disk 56, formed on the side nearest the diaphragm with a sufficient concavity to enable the diaphragm to work freely. The concave disk 56, which is fitted in the chamber 26, is pressed against the diaphragm by means of screws 62, screwed into a ring 58, furnished with retaining-ribs 59, which fit in grooves 60, that are formed in the walls of the chamber 26. In order to allow of tightening up the diaphragm, the latter is preferably strengthened around its edges by means of a metal ring 54, embedded in the caoutchouc and pierced with holes 55, into which the caoutchouc enters.

The chamber 26 is traversed by a pipe 25, which is open at one end to the atmosphere and the inner end of which opens into the concavity of the disk 56 near the face of the diaphragm 24. So long as there is equilibrium of pressure between the chambers 26 and 10 the diaphragm will be kept pressed against the orifice of this pipe 25 in consequence of difference in pressure between the chamber 10 and the atmosphere; but if the pressure in the chamber 10 diminishes the greater pressure in the chamber 26 will push back the diaphragm, which will uncover the orifice of the pipe 25, through which the air in the chamber 26, and consequently in the train-pipe 2, can escape into the atmosphere until equilibrium of pressure is reëstablished.

By a partial movement of the handle 3 of the cock the driver may bring the groove 8 of the movable disk 45 over the openings 37 and 38 of the disk 44, and thus establish communication between the chamber 10 and a chamber 22 of constant capacity (shown in dotted lines in Fig. 2) by means of the duct 12, the groove 36 of the disk 44, the duct 37, the groove 8 of the disk 45, and the duct 38, which opens in the said chamber 22. By reason of this operation the air contained in the chamber 10 will expand proportionally to the capacity of the chamber 22, and the diaphragm 24 will uncover the pipe 25 and allow the air in the train-pipe to escape into the atmosphere until the pressure therein has been reduced to the same point as in the chamber 10. The capacity of the chamber 22 is made such that the fall of pressure thus produced in the train-pipe will produce a moderate or partial application of the brakes, such as it is desirable to produce on gradients and on curves. If the movement of the handle 3 of the cock is extended to the end of its stroke, the groove 8 of the disk 45 will establish a communication between the openings 38, 39, and 46 of the disk 44 and the chambers 10 and 22 will be placed in communication with a cylindrical chamber 1 by the duct 46 of the disks 44, 43, and 42, the groove 47 of the latter, and the duct 48 through disks 42 41 and circular piece 40. The capacity of said chamber 1 is regulated in such a manner that the expansion of the air in the chambers 10 and 22 will produce in the train-pipe the desired fall of pressure for effecting the tightening of the brakes, which will cause a stoppage of the train under the atmospheric conditions then obtaining— that is to say, for producing the maximum efficiency. The capacity of the chamber 1 may be regulated by means of a screw 20, Fig. 3, provided at its end with a piston 21, which forms one of the walls of the chamber 1. Register-marks provided on the screw 20 serve to indicate the extent to which it must be screwed in in order to produce different determined capacities of the chamber 1. When the cock is moved back into the initial position in order to reëstablish the normal pressure in the train-pipe and the central chamber, either after a partial braking or after a complete braking or stoppage, the chambers 1 and 22 are placed in communication with the atmosphere by means of the ducts 49 and 50 through the movable disk 45.

I claim—

In operating-cocks for compressed-air brakes by means of which reductions of pressure are produced in the train-pipe by placing the latter in communication with the atmosphere by the opening of a diaphragm-valve produced by the expansion of compressed air contained in a central chamber, the combination with said central chamber of an expansion-chamber of constant capacity and an expansion-chamber the capacity of which can be adjusted beforehand and means for placing said central chamber in communication with either the first expansion-chamber alone or both expansion-chambers.

CHARLES LUYERS.

In presence of—
 D. E. WILLIAMS,
 G. PHELAN.